March 12, 1940.  V. F. ANTOINE  2,193,155
ARTICULATED BUS
Filed Nov. 1, 1938   3 Sheets-Sheet 1
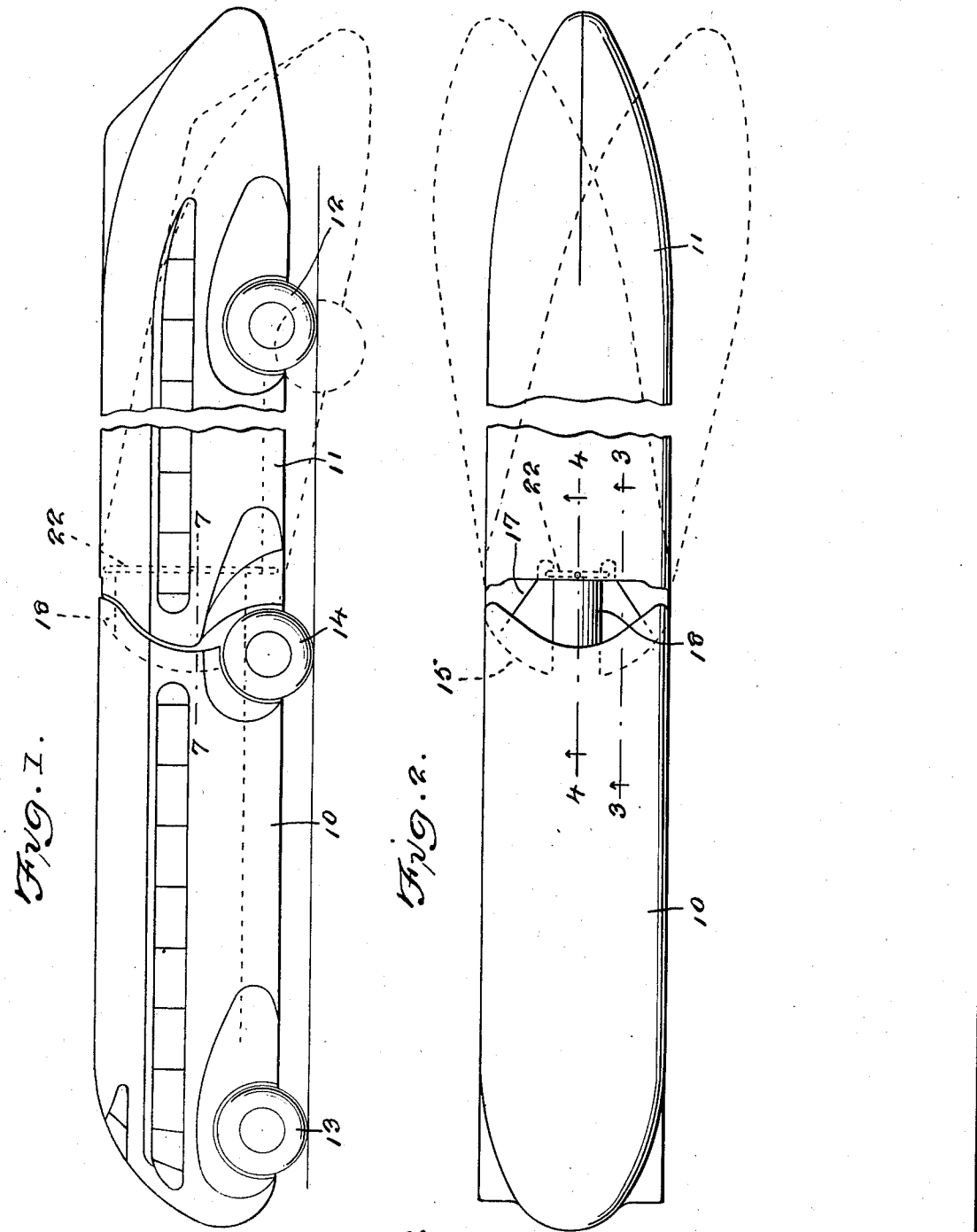
Vernon F. Antoine INVENTOR
BY Victor J. Evans & Co.
ATTORNEYS March 12, 1940.　　V. F. ANTOINE　　2,193,155
ARTICULATED BUS
Filed Nov. 1, 1938　　3 Sheets-Sheet 2
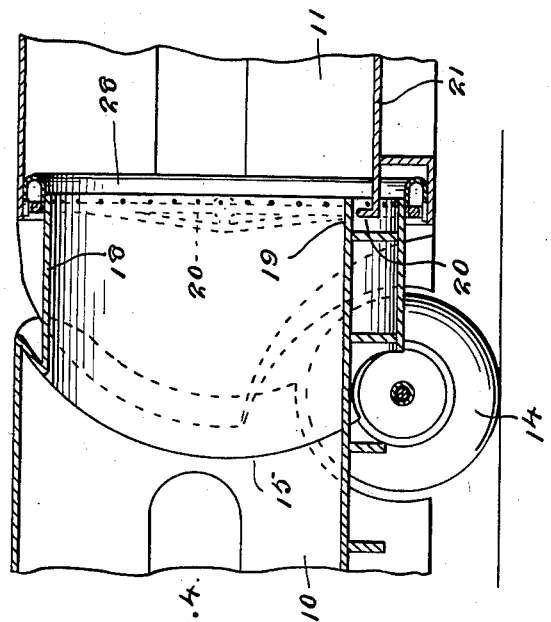
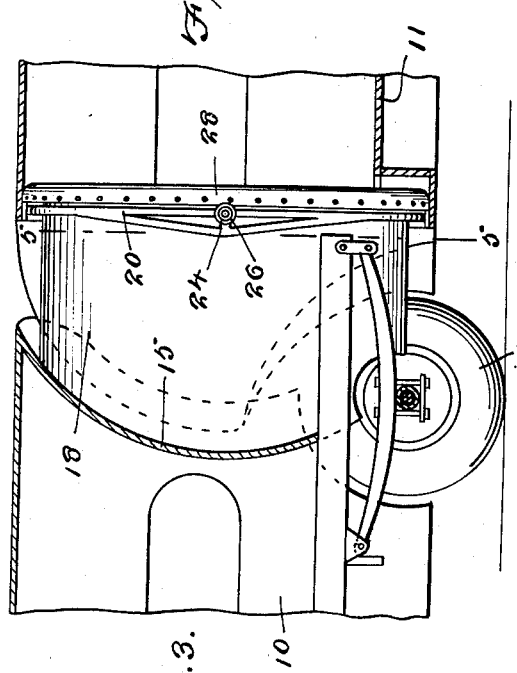
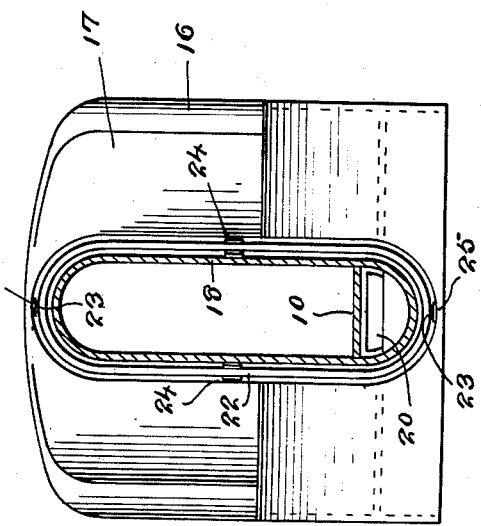
Vernon F. Antoine
INVENTOR

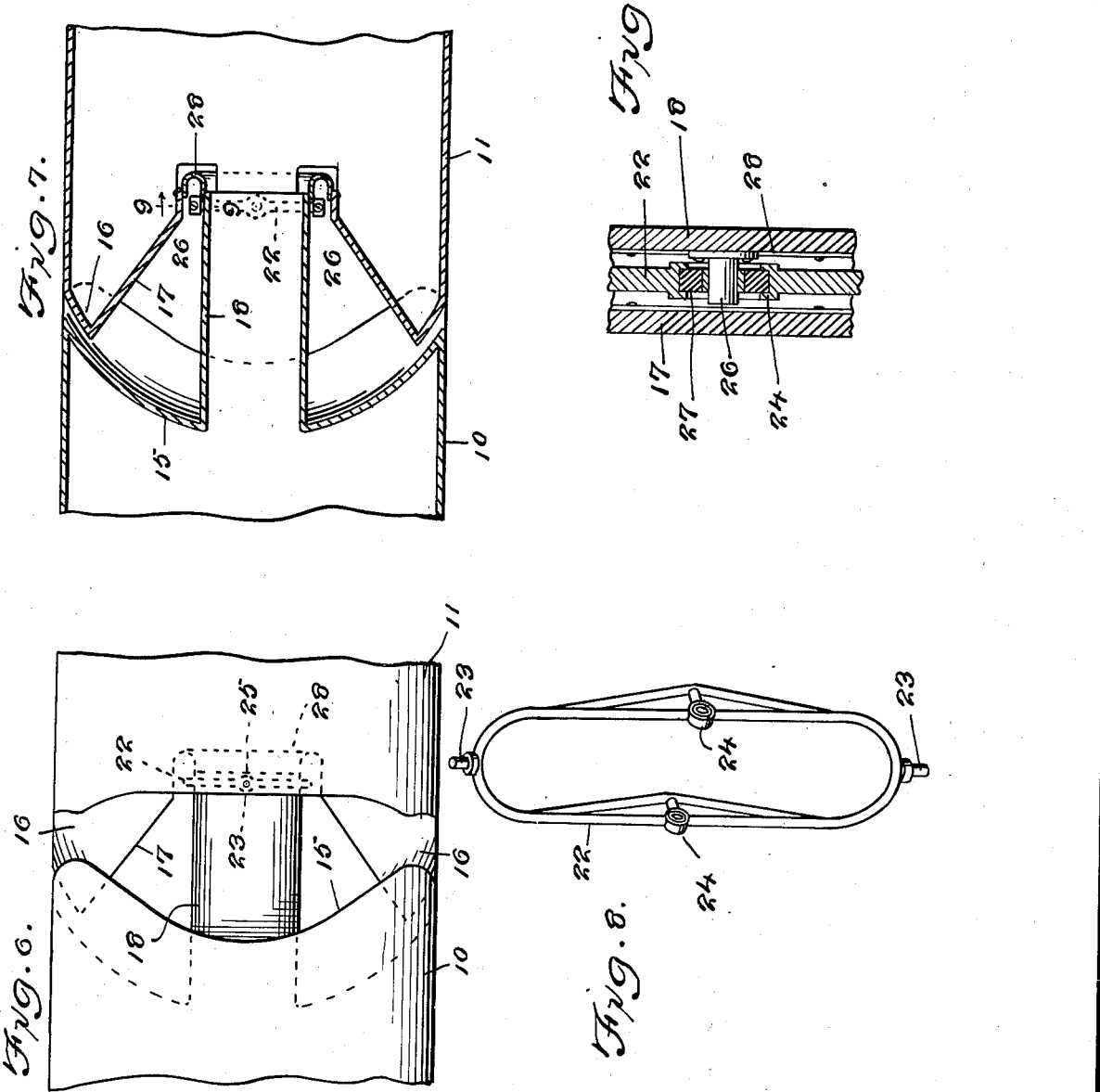

Patented Mar. 12, 1940

2,193,155

UNITED STATES PATENT OFFICE 2,193,155

ARTICULATED BUS

Vernon F. Antoine, Opportunity, Wash.

Application November 1, 1938, Serial No. 238,253

1 Claim. (Cl. 280—33)

This invention relates to articulated buses and has for an object to provide a bus of the semi-trailer type adapted to carry more passengers, promote greater comfort, and reduce operating costs per passenger.

A further object is to provide an articulated bus having a ball and socket joint between the front section and the rear section of such construction as to permit an unobstructed dust and water tight passageway between both sections.

A further object is to provide an articulated bus which will be strong and durable, which can be manufactured at a slightly greater cost than a single bus of one-half the passenger carrying capacity, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification:

Figure 1 is a side elevation of an articulated bus constructed in accordance with the invention and with the rear section shown in dotted lines as swung on the horizontal pivot of the joint.

Figure 2 is a plan view of the bus shown in Figure 1 and showing the rear section dotted in two positions of its swinging movement on the vertical pivot of the joint.

Figure 3 is a detail longitudinal sectional view taken on the line 3—3 of Figure 2 and shownig the rubber dust seal and the pivot yoke of the joint in side elevation.

Figure 4 is a detail longitudinal sectional view taken on the line 4—4 of Figure 2 and showing the passageway and step between the front section and the rear section.

Figure 5 is a vertical sectional view taken on the line 5—5 of Figure 3 and showing the rear section in front elevation.

Figure 6 is an enlarged fragmentary plan view of the ball and socket joint and passageway between the sections.

Figure 7 is a fragmentary longitudinal sectional view taken on the line 7—7 of Figure 1 showing the ball and socket joint and passageway.

Figure 8 is a detail perspective view of the pivot yoke.

Figure 9 is an enlarged detail sectional view taken on the line 9—9 of Figure 7 showing the rubber mounting of a pivot pin.

Referring now to the drawings in which like characters of reference designate similar parts in the various views, 10 designates the front section and 11 the rear section of a bus, the rear section being somewhat in the nature of a trailer supported by a single pair of ground wheels 12 while the front section is supported by front and rear pairs of ground wheels 13 and 14 respectively, the intermediate pair of ground wheels 14 being disposed at the joint between the sections and being driven from a motor in the nose of the front section.

The rear wall 15 of the front section is substantially semi-spherical in contour as shown best in Figure 7 to form the socket of a ball and socket joint between the sections. As also shown best in Figure 7 the front wall 16 of the rear section is rounded at its juncture with the side walls to provide the ball of the ball and socket joint. The front wall, furthermore is substantially conical as shown at 17 from the rounded portion to a point near the axis of the section to accommodate universal swinging movement of a passageway 18 between the sections.

The passageway 18 is formed integral with the rear wall 15 of the front section and is of the general shape shown best in Figure 5. The passageway is of sufficient height to permit passengers having full head room. The floor 19 of the passageway is spaced slightly from a riser 20, best shown in Figure 4, secured to the floor 21 of the rear section. Thus a step is provided between the front section and the rear section with sufficient clearance between the riser and the floor of the front section to permit rocking of the rear section on horizontal pivots when the bus is traveling over hilly terrain.

The front section is pivotally connected to the rear section by a yoke 22, best shown in Figure 8, the general contour of the passageway, as best shown in Figure 5, and disposed between the end of the passageway and the front wall 17 of the rear section, as best shown in Figures 7 and 9. The yoke is provided at the top and at the bottom with aligned pivot pins 23 and is provided at the centers of the sides with aligned socket members 24. The pivot pins 23 are received in socket members 25 formed in the roof and floor of the rear section, as best shown in Figures 4 and 5. Pivot pins 26 are secured to the wall 18 of the passageway and extend through the socket members 24 of the yoke. The pivot pins 23 form a vertical axis of rotation about which the rear section may swing laterally, as shown by dotted lines in Figure 2 when the vehicle is changing direction. The pivot pins 26 form a horizontal axis of rotation about which the rear section may swing vertically on hills.

Preferably all of the sockets are provided with rubber bushings 27, as best shown in Figure 7, to take up shocks and jars and at the same time reduce noise to a minimum. To render the ball and socket joint water and dust proof an endless rubber seal 28, of U-shape cross section, is secured at the opposite edges thereof, to the rear open end of the passageway 18 and to the passageway receiving opening in the front wall 17 of the rear section. The seal is sufficiently flexible to yield without danger when the front and rear sections move relatively to each other under various conditions of service.

From the above description it is thought that the construction and operation of the invention will be fully understood without further explanation.

What is claimed is:

In an articulated bus, a body comprising a front section, a rear section, said front section having a rear wall substantially semi-spherical in contour to form the ball of a ball and socket joint between the sections, said rear section having a front wall rounded at its juncture with the side walls to provide the ball of said ball and socket joint, the front wall of the rear section being substantially conical from said rounded portion to a point near the longitudinal axis of the section, a passageway formed integral with the rear wall of the front section of sufficient height to permit passengers having full head room, said conical front wall of the rear section accommodating swinging movement of the passageway, said passageway having a floor, a riser extending from the floor of the rear section, the floor of the passageway being spaced slightly above the riser to provide a step between the front section and the rear section, said step having sufficient clearance above the riser to permit rocking of the rear section on a horizontal axis when the bus is travelling over hilly terrain, and pivotal means disposed between the rear end of the passageway and the front end of the rear section permitting both sections to pivot on a vertical axis and on a horizontal axis.

VERNON F. ANTOINE.